(12) United States Patent
Schneider

(10) Patent No.: US 6,246,716 B1
(45) Date of Patent: Jun. 12, 2001

(54) INFORMATION COMMUNICATION SYSTEM

(75) Inventor: Kevin Wayne Schneider, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 08/792,632

(22) Filed: Jan. 31, 1997

(51) Int. Cl.$^7$ ........................................ H04B 1/38
(52) U.S. Cl. ........................... 375/220; 375/263; 375/290
(58) Field of Search ........................... 375/220, 222, 375/286, 241, 353; 370/201, 281

(56) References Cited

U.S. PATENT DOCUMENTS

| | | | |
|---|---|---|---|
| 4,481,622 | * 11/1984 | Cheng et al. | 370/30 |
| 5,119,401 | * 6/1992 | Tsujimoto | 375/14 |
| 5,267,262 | * 11/1993 | Wheatley, III | 375/1 |
| 5,377,230 | * 12/1994 | Golden | 375/296 |
| 5,400,322 | * 3/1995 | Hunt et al. | 370/19 |
| 5,521,949 | * 5/1996 | Huang et al. | 375/377 |
| 5,613,210 | * 3/1997 | Van Driel et al. | 455/45 |
| 5,818,879 | * 10/1998 | Eyuboglu et al. | 375/286 |

FOREIGN PATENT DOCUMENTS

| | | |
|---|---|---|
| 0091014A | 10/1983 | (EP) . |
| 0653859A | 5/1995 | (EP) . |
| 9706619A | 2/1997 | (WO) . |

OTHER PUBLICATIONS

M. Tomlinson, "New Automatic Equalisers Employing Modulo Arithmetic", Electronics Letters, vol. 7 nos 5/6 pp. 138, Mar. 25, 1971.*

Bingham, John A. C. "Multicarrier Modulation for Data Transmission: An Idea Whose Time Has Come", IEEE Communications Magazine, May 1990.*

Proakis, John G., Digital Communications, third edition (WCB/McGraw–Hill, 1995), chapter 13, pp. 695–710.*

* cited by examiner

*Primary Examiner*—Stephen Chin
*Assistant Examiner*—Mohammad Ghayour
(74) *Attorney, Agent, or Firm*—Brumbaugh Graves Donohue & Raymond; John A. Fogarty, Jr.

(57) ABSTRACT

The present invention is a communication system for communicatinginformation over greater distances than otherwise possible on bidirectional media subject tointerference, by reducing the interference while assuring spectral compatibility with other communication services. The system of the present invention provides symmetric data service to end users by using asymmetric signaling. In one embodiment, the present invention utilizes partially overlapped, non-symmetric baud rates and spectrally shaped transceiver filters to achieve both spectral compatibility and extended range.

23 Claims, 3 Drawing Sheets

INFORMATION COMMUNICATION SYSTEM

BACKGROUND OF THE INVENTION

The present invention relates to improved methods and apparatus for communicating information over greater distances than otherwise possible on bidirectional media subject to extraneous power, which tends to interfere with the reception of the desired signals ("interference"). Interference includes unwanted disturbances superimposed upon a useful signal, which tend to obscure its information content, and undesired disturbances within the useful frequency band, e.g., (1) disturbances produced by other information communication services and (2) undesired energy appearing in one signal path of a bidirectional medium as a result of coupling thereto from one or more other signal paths in the medium ("crosstalk").

The signal, i.e., the intelligence, message, or effect, to be conveyed over a communication system, is coupled to a bidirectional medium by a directional coupler, i.e., a device at a transceiver used to separate energy to be transmitted from energy to be received, e.g., a hybrid circuit, an analog echo-canceler, a digital echo-canceler, a frequency splitter with echo-cancellation, or a 2wire–4wire ("2W–4W") convertor. The bidirectional media can be radio or microwave links through air or outer space, or copper wire twisted pairs.

In telephony, copper wire twisted pairs are typically placed in bundles or groups of 50 pairs per cable; see S. V. Ahamed, P. P. Bohn and N. L. Gottfried, *"A Tutorial on Two-Wire Digital Transmission in the Loop Plant,"* IEEE Transactions on Communications, vol. COM-29, no. 11, p. 1554 (November 1981); J. Werner, *"The HDSL Environment,"* IEEE Journal In Selected Areas In Communications, vol. 9, No. 6, p. 785 (Aug. 1991). Twisted wire pairs carry signals between a central office and a plurality of subscribers ("local loop"). Signals conveyed on copper wire twisted pairs are susceptible not only to crosstalk, but also to other interference such as thermal noise, DC wander, jitter, intersymbol interference ("ISI"), and quantization noise.

Crosstalk is generally classifiable into two kinds, based on the location of the interfering transmitter with reference to the bidirectional media into which the crosstalk is coupled, i.e., near-end crosstalk ("NEXT") and far-end crosstalk ("FEXT"). Interfering signal transmitters located at the same end of the bidirectional media as the signal receiver of interest cause near-end crosstalk, whereas interfering signal transmitters located at the end of the bidirectional media remote from the signal receiver of interest cause far-end crosstalk. Crosstalk is sub-classifiable into self-crosstalk, i.e., interference coupled from transmitters to receivers of the same kind, and inter-crosstalk, i.e., interference coupled from transmitters to receivers of a different kind. From the viewpoint of the receiver of interest, inter-crosstalk includes crosstalk coupled into the bidirectional medium to which the transmitter of interest is connected ("ingress crosstalk") and crosstalk coupled out of the bidirectional medium to which the receiver of interest is connected ("egress crosstalk").

Crosstalk becomes an increasingly troublesome undesirable signal impairment as a function of increasing frequency. Crosstalk on copper wire twisted pairs can be the limiting impairment for symmetric transmission on the local loop. Because near-end crosstalk from interfering transmitters at the central office or at a remote location is not attenuated by transmission loss over the length of the bidirectional medium, near-end crosstalk is potentially the dominant impairment of signal communication on the medium. Far-end crosstalk is only significant at those frequencies where near-end crosstalk is not present or is small. Far-end crosstalk is typically less severe an impairment than near-end crosstalk, because far-end crosstalk is attenuated by traveling over the full length of the bidirectional medium.

Conventional services on a digital subscriber loop, such as "BR-ISDN" or "BRI" (basic-rate integrated services digital network ("ISDN") service), and conventional high-bit-rate digital subscriber loop service ("HDSL"), are communications systems designed to employ symmetric echo-canceled transmission. As a result, self-NEXT is the dominant crosstalk impairment in such systems, limiting the range of communication on the loop. These conventional symmetric digital subscriber loop ("SDSL") communication systems are designed to tolerate the 1% worst case crosstalk interference from a full binder group of services of the same kind. Interference due to crosstalk into either BRI or HDSL services from different services is less significant an impairment to BRI or HDSL than self NEXT.

The conventional asymmetric digital subscriber loop ("ADSL") communication system, on the other hand, originated as a frequency division multiplexed ("FDM") communication system, where the transmitted signals over the bidirectional medium do not share the same spectrum, in whole or in part. By employing bidirectional transmission in non-overlapped bandwidths, the conventional FDM system eliminated self near-end crosstalk as a range limiting impairment and eliminated any requirement for echo-cancellation. The range of the conventional ADSL service is limited by near-end crosstalk from different services, e.g., the conventional BRI and the HDSL systems, and far-end crosstalk from other conventional ADSL systems. The conventional ADSL system employs asymmetric data transmission rates, which makes the ADSL service spectrally incompatible with T1 carrier, both from an ingress and also an egress point of view, when the T1 carrier is in the same or in an adjacent binder group with respect to the ADSL system. It is recognized that ANSI T1.413 includes an echo-cancellation option for ADSL service, but because of the asymmetry of the transmission rates, ADSL is still largely an FDM design.

Another conventional technique for designing symmetric digital subscriber loop systems is time division multiplexing or time compression multiplexing of bidirectional transmissions ("ping-pong transmission"). Ping-pong transmission has been proposed for the very high-speed digital subscriber line ("VDSL") systems under the name synchronized DMT ("SDMF"). As is the case for the FDM system, ping-pong transmission eliminates self near-end crosstalk as a signal range limiting impairment; inter-crosstalk is the impairment which limits ping-pong transmission services.

Conventional FDM systems and symmetric echo-canceled transmission systems have been proposed for the prospective single-pair HDSL ("HDSL2") system. The prospective HDSL2 system has the following specifications: (1) symmetric data transmission at a 1.552 Mbps data transmission rate, which includes 1.544 Mbps for information and 8 kbps for framing and overhead used for maintenance and performance monitoring; (2) a 5–6 dB margin in the presence of worst case crosstalk; and (3) inter-crosstalk from the HDSL2 system must not be the limiting impairment for existing services.

None of the conventional transmission techniques proposed for implementing the HDSL2 service in a telephone company carrier service area ("CSA") range is able to satisfy these HDSL2 system specifications; cf. TR-28, "A Technical Report on High-Bit-Rate Digital Subscriber Lines (*HDSL*)," prepared by the T1E1.4 Working Group in Digital Subscriber Lines (February 1994) with respect to CSA considerations. Although the conventional FDM system is thought to be capable of reaching the CSA range, the FDM technique has proven inadequate because of unacceptable levels of ingress and egress inter-crosstalk, especially with respect to T1 carrier service.

The failure of conventional techniques to meet the CSA range requirement for transmission of HDSL2 service on a single copper wire twisted pair at the specified symmetric transmission rate of 1.552 Mbps is caused by the fact that each of these conventional techniques operates at an extreme. For the conventional symmetric, echo-canceled system, the extreme is the dominant impairment of self-NEXT. For the conventional FDM and the conventional ping-pong transmission techniques, the extreme is the dominant range-limiting impairment of inter-crosstalk with respect to different services in the same or adjacent binder group, even though self-NEXT is completely eliminated.

The information communication system art requires a new transmission technique for communicating information over greater distances than are otherwise possible on bidirectional media subject to interference, which technique does not possess the drawbacks of conventional techniques.

It is, therefore, a principal object of the present invention to increase the range of signal communications on bidirectional media by reducing the effects of interference.

It is another object of the present invention to provide a new signal transmission technique that reduces self-NEXT while minimizing interference both with existing services and also prospective services.

It is a further object of the present invention to increase the range of a high-speed data transmission system for the local loop, by reducing self-near end crosstalk to the level of inter-crosstalk from other services.

It is yet another object of the present invention to minimize egress inter-crosstalk interference into existing services, while at the same time increasing the range of signal communication on bidirectional media.

SUMMARY OF THE INVENTION

In accordance with the present invention, a method for communicating information at symmetrical information communication rates on a bidirectional medium subject to interference, is characterized by the steps of: (1) transmitting the information in a first plurality of bandwidths in a first direction on said medium; and (2) transmitting the information in a second plurality of bandwidths in a second direction on the medium; (3) wherein the first and second pluralities of bandwidths are partially overlapped bandwidths.

In further accordance with the present invention, a method for communicating data at symmetrical data transmission rates on a bidirectional medium subject to interference, is characterized by the steps of: (1) transmitting the data in a first bandwidth in a first direction on said medium, the first bandwidth having at least one passband for said data; and (2) transmitting the data in a second bandwidth in a second direction on the medium, the second bandwidth having at least one passband for the data; (3) wherein the passbands in the first and second bandwidths are partially overlapped passbands.

In yet another aspect of the present invention, a method for communicating information at symmetrical information transmission rates on a bidirectional medium subject to interference is characterized by the steps of: (1) transmitting the information in a first bandwidth in a first direction on said medium; and (2) transmitting the information in a second bandwidth in a second direction on the medium; (3) wherein the first and second bandwidths are partially overlapped bandwidths.

In further accordance with the present invention, an apparatus for communicating information at symmetrical transmission rates on a bidirectional medium subject to interference is characterized by the combination of: (1) a first transceiver communicating on the medium in first and second directions; (2) a second transceiver communicating on the medium in first and second directions; (3) a first directional coupler connecting the first transceiver to the medium; (4) a second directional coupler connecting the second transceiver to the medium; the transceivers being so constructed and arranged that communication on the medium in the first and second directions takes place in partially overlapped bandwidths.

DETAILED DESCRIPTION OF THE INVENTION

Figure 1:
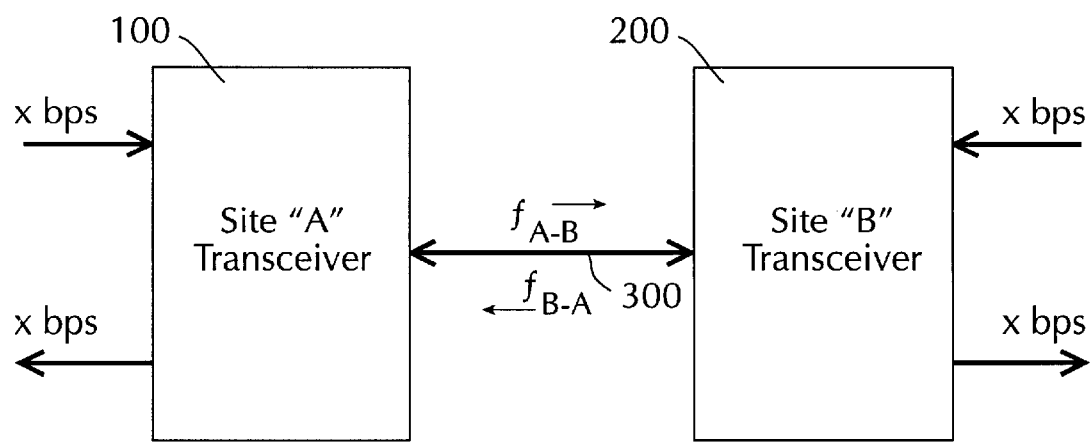
FIG. 1 is a preferred embodiment of the present invention.

FIG. 1 depicts an apparatus constructed and arranged in accordance with the present invention for implementing a method for communicating information at symmetrical rates on a bidirectional medium subject to interference. In accordance with the invention, the method implemented is characterized by the steps of. (1) transmitting the information in a first bandwidth in a first direction on the medium, the first bandwidth having at least one passband for the information; and (2) transmitting the information in a second bandwidth in a second direction on the medium, the second bandwidth having at least one passband for the information; (3) wherein the passbands in the first and second bandwidths are partially overlapped passbands.

With reference to FIG. 1, an information communication system constructed and arranged in accordance with the present invention comprises a first plurality of transceivers 100 located at site "A" for providing one or more communication services via bidirectional media 300 to a second plurality of transceivers located at one or more sites "B". By way of illustration, and not limitation, FIG. 1 depicts only one such transceiver at site "A" and one such transceiver at one of sites "B." The system of FIG. 1 can be utilized in various service applications, e.g., mobile radio communications, satellite communications, and telephony. Bidirectional transmission media 300 can be any transmission media subject to interference, e.g., air, space, or copper wire twisted pairs. The mode of communication via media 300 can be full-duplex or half-duplex. For half-duplex operation, the present invention is most useful when a plurality of transceivers at a site are operated asynchronously.

The receive and transmit components of first and second transceivers 100, 200 comprise conventional components as required by the specific application. For mobile radio communications, one transceiver site comprises base station equipment and the other transceiver sites comprise portable transceiver equipment. See Robert G. Winch, "Telecommunication Transmission Systems" (1993). Digital transmission over local loops from a central office ("downstream" site) to a plurality of subscriber sites ("upstream" site) employs transceivers comprising conventional channel coders, line coders, modulators and demodulators, equalizers, precoders, decoders, and decision devices, as required by the specific application. See, S. V. Ahamed, P. P. Bohn and N. L. Gottfried, "A Tutorial on Two-Wire Digital Transmission in the Loop Plant," IEEE Transactions on Communications, vol. COM-29, no. 11, p. 1554 (November 1981); TR-28, "A Technical Report on High-Bit-Rate Digital Subscriber Lines (HDSL)," prepared by T1E1.4 Working Group in Digital Subscriber Lines (February 1994); M. Tomlinson, "New Automatic Equalisers Employing Modulo Arithmetic", Electronics Letters, vol. 7, nos. 5/6, pp. 138 (Mar. 25, 1971); R. Price, "Non-Linearly Feedback-Equalized PAM v. Capacity for Noisy Filter Channels," Proc. 1972 IEEE International Conference on Communications, p. 22–12 (June 1972); G. Ungerboeck, "Channel Coding With Multi-Level/Phase Signals," IEEE Transactions on Information Theory, vol. IT-28, p. 55 (January 1982); R. W. Lucky, J. Salz and E. J. Weldon, Jr., "Principles of Data Communication," (1968); A. J. Viterbi and J. K. Omura, "Principles of Digital Communications and Coding," (1979); Simon Haykin, "Communication Systems," (1983); M. Schwartz, "Information Transmission, Modulation, and Noise," ($4^{th}$ Ed. 1990); Jerry D. Gibson, "Digital and Analog Communications," ($2^{nd}$ Ed. 1993); Robert G. Winch, "Telecommunication Transmission Systems," (1993); Jacky S. Chow, Jerry C. Tu and John M. Cioffi, "A Discrete Multitone Transceiver System for HDSL Applications," Journal on Selected Areas in Communications, vol. 9, no. 6, p.895 (August 1991); U.S. Pat. No. 5,414,733, "Decision Feedback Equalizer Employing Fixed Ratio Postcursor Taps for Minimizing Noise and Intersymbol Interference in Signals Conveyed Over High Speed Data Service Loop," issued to M. Turner.

Figure 2:
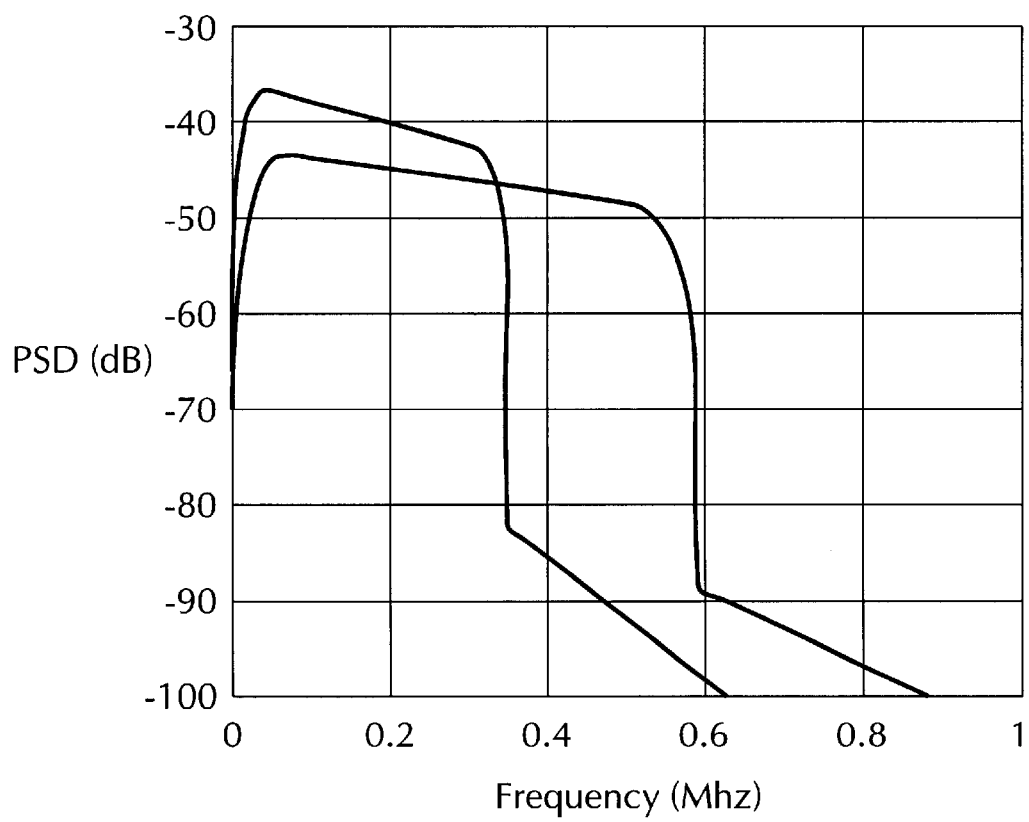
FIG. 2 is an example of spectral shaping for the apparatus of FIG. 1.

Referring again to FIG. 1, information inputs at symmetrical signaling rates ("x bps") are provided to first and second transceivers 100, 200. In accordance with the present invention, such inputs to transceivers 100, 200 are transmitted on medium 300 in partially overlapped bandwidths $f_{A-B}$ and $f_{B-A}$ using asymmetric signaling rates. In further accordance with the invention, the transmitted signals in the partially overlapped bandwidths are spectrally shaped. Spectral shaping includes unequal transmit power in each direction and filtering, e.g., passband shaping, shaping of the transition from a passband to at least one stopband, and the ultimate attenuation in the stopband. In accordance with the present invention, spectral shaping assures compatibility with other communication services. FIG. 2 depicts spectral shaping for the apparatus of FIG. 1.

Figure 3:
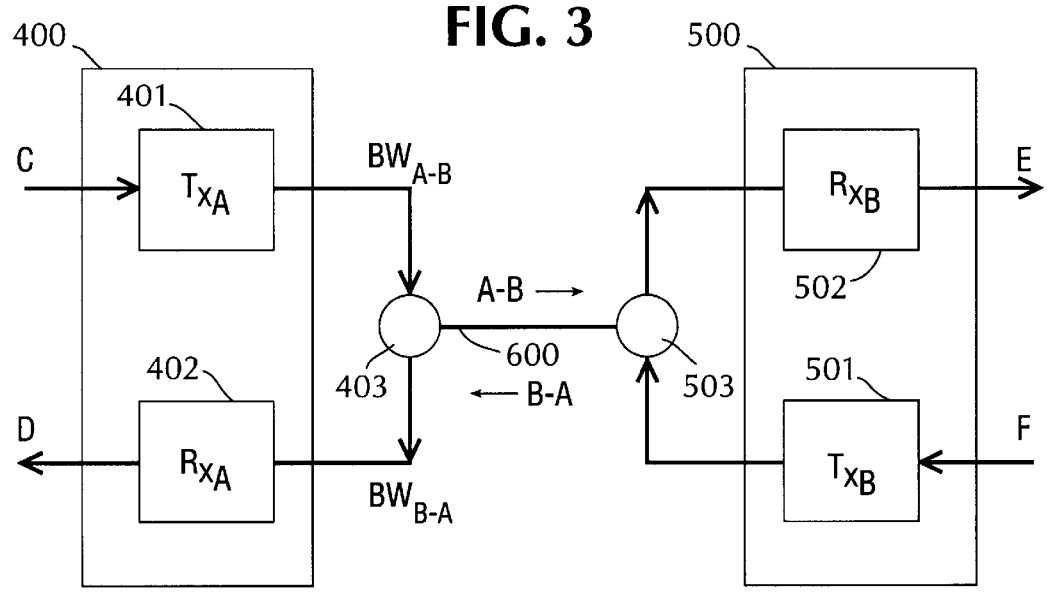
FIG. 3 is a second preferred embodiment of the present invention.

FIG. 3 depicts an apparatus for implementing a method for transmitting information at symmetrical rates on a channel subject to interference. In accordance with the invention, the method implemented is characterized by the steps of (1) transmitting the information at a first baud rate in a first bandwidth in a first direction on the channel; and (2) transmitting the information at a second baud rate in a second bandwidth in a second direction on the channel, wherein the first and second bandwidths are partially overlapped bandwidths; (3) spectrally shaping at least one of the bandwidths; and (4) directionally coupling the data to the channel.

Referring to FIG. 3, the apparatus comprises a first plurality of transceivers 400 located at site "A" for providing one or more communication services via bidirectional medium 600 to a second plurality of transceivers 500 located at one or more sites "B." By way of illustration, and not limitation, FIG. 3 depicts only one such transceiver at site "A" and one such transceiver at one of sites "B." Bidirectional medium 600 is a channel or data link of conventional construction, e.g, a plurality of copper wire twisted pairs. Transmitters 401 transmit information to the receivers 502 at sites "B" via links or channels A-B of medium 600; transmitters 501 transmit to information to site "A" receivers 402 via link or channels B-A of medium 600. Channels A-B and B-A are subject to interference.

The transmitters at sites "A" and "B" depicted in FIG. 3 are conventionally constructed and arranged as required by the specific application. In digital communication, transmitters 401, 501 can be configured to perform line coding, channel coding, preceding, modulation, and/or pre-equalization, as required by the specific application. See TR-28, "A Technical Report on High-Bit-Rate Digital Subscriber Lines (HDSL)," prepared by T1E1.4 Working Group in Digital Subscriber Lines (February 1994); M. Tomlinson, "New Automatic Equalisers Employing Modulo Arithmetic," Electronics Letters, vol. 7, nos. 5/6, pp. 138 (Mar. 25, 1971); R. Price, "Non-Linearly Feedback-Equalized PAM v. Capacity for Noisy Filter Channels," Proc. 1972 IEEE International Conference on Communications, p. 22–12 (June 1972); G. Ungerboeck, "Channel Coding With Multi-Level/Phase Signals," IEEE Transactions on Information Theory, vol. IT-28, p. 55 (January 1982); and the textbooks identified above.

Referring to FIG. 3, site "A" and site "B" information inputs (C) and (F) enter their respective transmitters 401 ($Tx_A$) and 501 ($Tx_B$) at the same rates. In the A-B channel direction, transmitters 401 modulate the site "A" data input (C) into a sequence of symbols having a bandwidth $BW_{A-B}$ on channel A-B. In the B-A channel direction, transmitters 501 modulate the site "B" information input (F) into a sequence of symbols having a bandwidth $BW_{B-A}$ on channel B-A. The signals in the A-B and B-A directions are directed through directional couplers 403, 503, respectively, and are thereby coupled to medium 600.

After transmission on medium 600, the transmitted information is directed through directional couplers 403 and 405, respectively, to receivers 402 ($Rx_A$) and 502 ($Rx_B$.) Receivers 402, 502 are of conventional construction and arrangement, performing demodulating, filtering, equalizing, and decoding functions, as required by the specific application. The resulting information outputs (D) and (E) are provided by receivers 402 and 502 with the same data rate.

The communication system of the present invention can utilize asymmetric baud rates, or offset symmetrical baud rates, while maintaining symmetric data rates at the site "A" and site "B" locations. The A-B channel bandwidth, $BW_{A-B}$, is chosen to be different from the B-A channel bandwidth, $BW_{B-A}$, such that the bandwidths are partially overlapped. Each bandwidth, $BW_{A-B}$ and $BW_{B-A}$, is characterized by at least one passband and one stopband, thereby allowing each transmitter 401, 501 to use the appropriate baud rate. Because the transmissions on medium 600 are effected, in accordance with the present invention, in partially overlapped bandwidths, the resulting communication system realizes a significant reduction in self-NEXT, since where the bandwidths, $BW_{A-B}$ and $BW_{B-A}$, do not overlap, self-NEXT is completely eliminated. In accordance with the present invention, by designing the amount of the overlap in the bandwidths, $BW_{A-B}$ and $BW_{B-A}$, and the relative transmit levels, self-NEXT can be reduced to no more than the level of the interference from other services. In another embodiment of the present invention constructed in accordance with FIG. 3, multi-carrier transmission is employed between site "A" and sites "B" wherein a plurality of bandwidths in the A-B direction are arranged to partially overlap a plurality of bandwidths in the B-A direction.

The present invention utilizes spectral shaping techniques to shape the power spectral density ("spectrum") of the partially overlapped bandwidths, with respect to frequency and the relative amplitudes of the partially overlapped bandwidths, the passbands, the ultimate attenuation in stopbands, and the transition bands, whereby the transmission range is increased and the interference into other services is minimized. By means of partially overlapped bandwidths and spectral shaping, the present invention limits interference into and from the same or different services. In the application of the present invention to HDSL2 service, for example, the other services include but are not limited to T1, ISDN, HDSL and ADSL.

Figure 4:
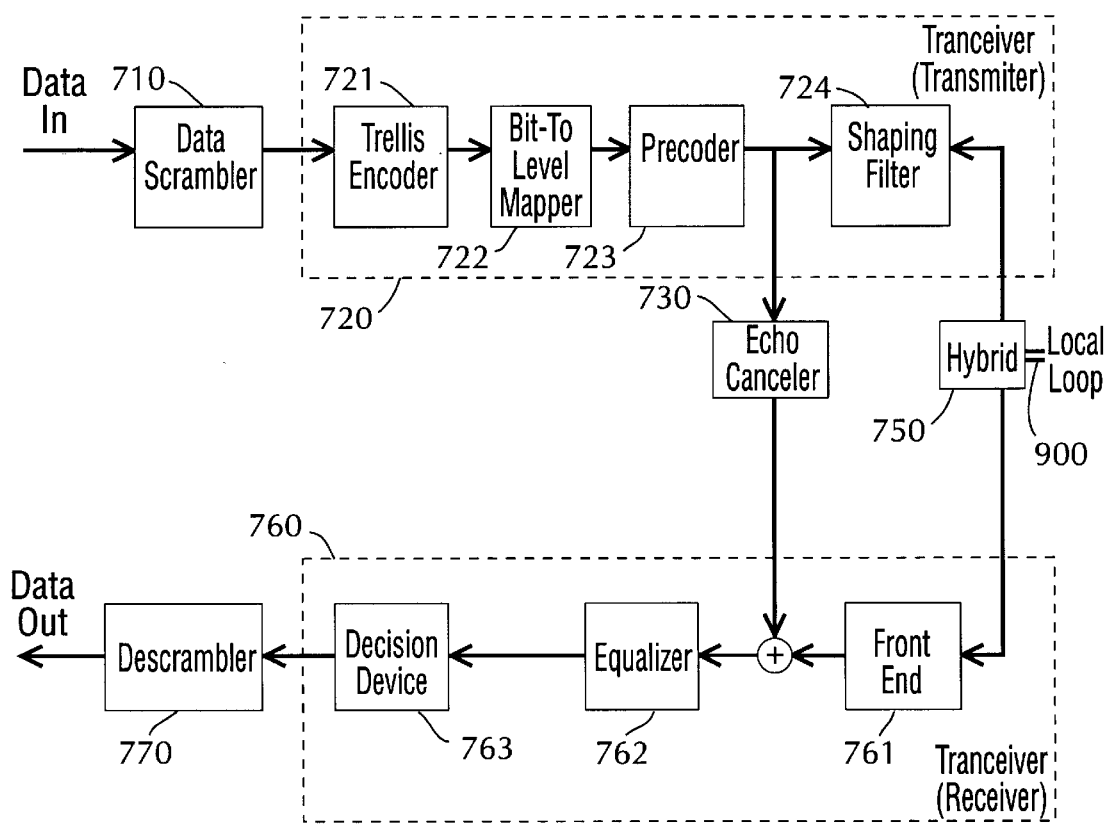
FIG. 4 is a third preferred embodiment of the present invention.

FIG. 4 depicts an apparatus for implementing a method for communicating information at symmetrical transmission rates on a bidirectional medium subject to interference. In accordance with the present invention, the method implemented is characterized by the steps of: (1) transmitting the information in a first bandwidth in a first direction on the medium, the first bandwidth having at least one passband for the information; and (2) transmitting the information in a second bandwidth in a second direction on the medium, the second bandwidth having at least one passband for the information; (3) wherein the passbands in the first and second bandwidths are partially overlapped passbands.

By way of illustration, and not limitation, FIG. 4 depicts a PAM ("pulse amplitude modulation") implementation of the communication system of FIG. 3 for HDSL2 service. Referring to FIG. 4, transceiver 720/760 is of the kind identified in FIG. 3 as transceivers 400, 500. Input information such as inputs "C" and "F" ("Data In") is provided to the transceivers 720/760 at the rate of 1.552 Mbps via conventional scramblers 710. Scrambler 710 randomizes the input data. The randomized data are provided to the transmitter portion 720 of the transceiver 720/760. The transmitter portion 720 is of conventional construction and can comprise conventional channel coding apparatus, such as trellis encoder 721, to which the randomized input data are applied. The output of trellis encoder 721 is processed by bit-to-level mapper 722 to produce a line code lying in a PAM signal space. In other embodiments of the present invention constructed in accordance with FIGS. 3–4, the line code selected can correspond to QAM, CAP or DMT. If a bandpass system is used, a conventional modulator and corresponding demodulator (not shown) can be added to the arrangement of FIG. 4.

Figure 5:
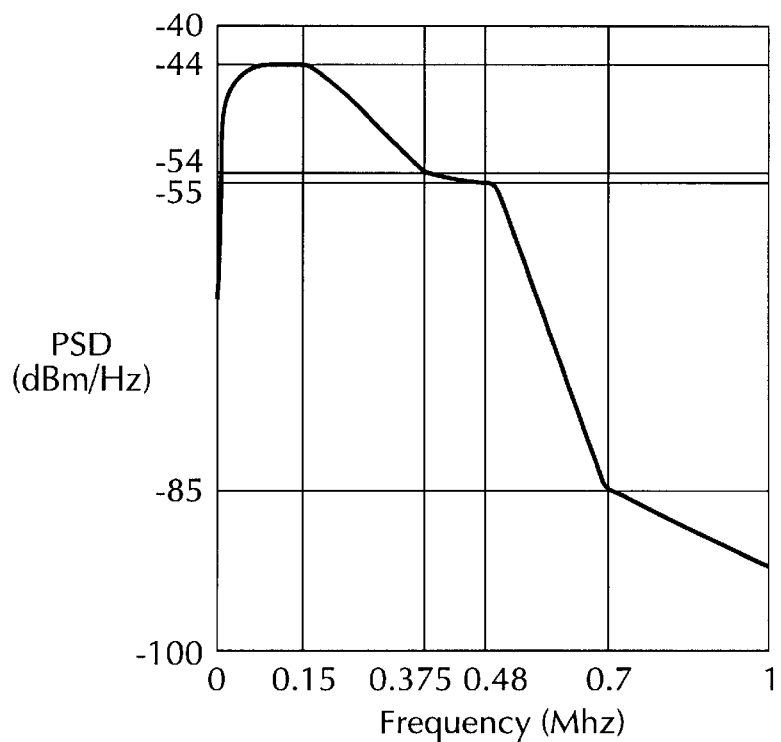
FIG. 5 depicts the downstream transmit power spectral density for the embodiment of FIG. 4.
Figure 6:
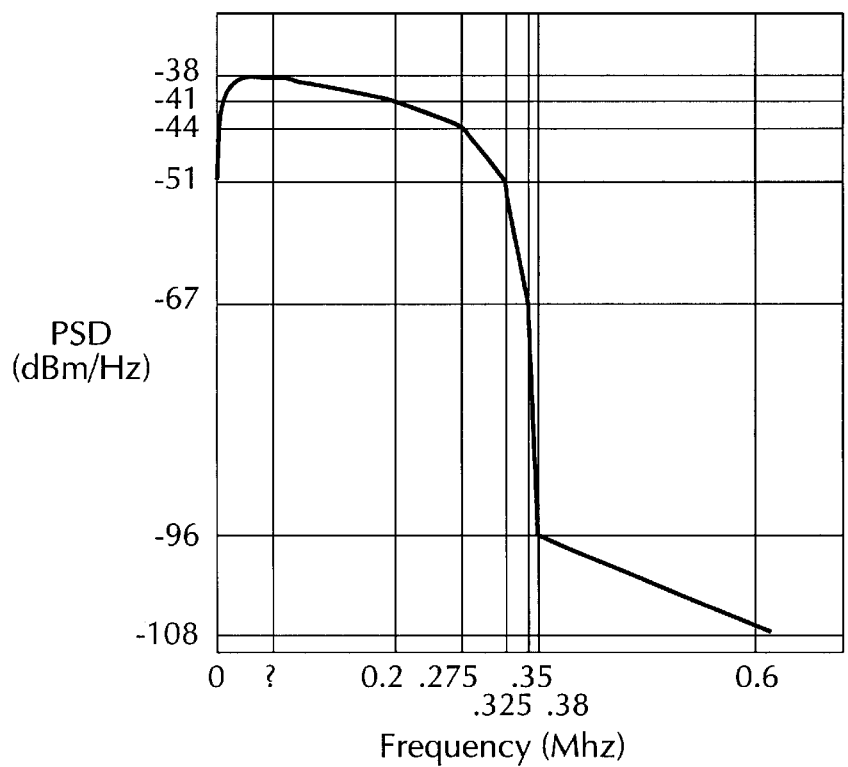
FIG. 6 depicts the upstream transmit power spectral density for the embodiment of FIG. 4.

The PAM signal output of bit-to-symbol mapper 722 is pre-equalized by conventional precoder 723, for example as described in the Tomlinson and Price publications identified above. The precoded signal is shaped by filter 724. Additionally, the precoded signal is provided to a conventional adaptive echo-canceler 730. Filter 724 has at least one passband, one transition band, and one stop band as depicted in FIGS. 5, 6. By way of illustration, and not limitation, FIG. 5 depicts the filter characteristic for transmission from a central office to a remote subscriber via the local loop 900 ("downstream" transmission) and FIG. 6 depicts the filter characteristic for transmission via the local loop 900 from a remote subscriber to a central office ("upstream" transmission). The signal output from the transmitter filter is placed on the local loop 900 via conventional hybrid 750.

In accordance with the present invention, embodiments constructed and arranged in accordance with FIGS. 3, 4: (1) can omit the channel coding and pre-equalization functions described with reference to FIG. 4, (b) can utilize scrambler 710 and bit-to-symbol mapper 722 without channel coding, e.g., by trellis encoder 721, and precoder 723, (c) can utilize scrambler 710, bit-to-symbol mapper 722, channel coding, e.g., by trellis encoder 721, omitting precoder 723, and (d) can utilize scrambler 710, bit-to-symbol mapper 722 and precoder 723, omitting channel coding, e.g., by trellis encoder 721.

The receiver portion 760 of the transceiver 720/760 comprises conventional receiver front end 761 to which transmissions on the local loop 900 are provided by hybrid 750. The signal output of front end 761 is echo-cancelled by adaptive echo canceler 730 and provided to conventional decision device 763, which can be a conventional trellis decoder, via conventional adaptive feed forward equalizer 762. In operation, decision device 763 decodes its input signal, providing an output signal to conventional descrambler 770. The output of descrambler 770 comprises the information output D, F ("Data Out") at the symmetric 1.552 Mbps rate.

In the PAM embodiment of the present invention described with reference to FIGS. 3–6, information is transmitted downstream in a bandwidth of 1.03467 MHZ, while information is transmitted upstream in a bandwidth of 620.8 kHz. Use of the partially overlapped bandwidths enables reduction of self-NEXT generated by HDSL2 service to levels of interference attributable to other services.

In further accordance with the invention, in the PAM embodiment, the downstream and upstream signals are spectrally shaped by transmitter filters 724. The spectral shaping of the transmit power spectral densities (passbands, stopbands, and transition bands) for the PAM embodiment of HDSL2 service depicted in FIGS. 5 and 6 assure spectral compatibility with other services in the same or adjacent binder groups.

In accordance with the PAM embodiment of present invention, the combination of partially overlapped bandwidths and spectral shaping produces the results shown below in Tables 1 through 7 and A. Tables 1, 2, and A show margins, i.e., excess received signal to interference ratios ("SNR") over what is required for a 1/10,000,000 error rate on central office CSA 4 and CSA 6 loops; cf TR-28 Report identified above regarding the characteristics of CSA 4 and CSA 6 loops. Margins are shown in the Tables for various combinations of known interferers.

Tables 3 through 7 show the margins realized by other services in the presence of egress inter-crosstalk from the HDSL2 PAM embodiment of the present invention. Margins in the presence of other interferers are provided to show that crosstalk attributable to the PAM embodiment does not significantly exceed the crosstalk caused by the other interferers.

In some service situations on the local loop 900 (not depicted), where no ADSL system is present, it can be desirable to reverse the directions of the partially overlapped narrow-band and wide-band signals, so that the narrow bandwidth is employed in the downstream direction and the wide bandwidth is employed in the upstream direction. Additionally, in such embodiment, the communication system of the present invention can be constructed and arranged so that the transmitters are automatically swapped between downstream and upstream directions upon sensing an interference level that exceeds a predetermined preselected level.

The following Table is a detailed summary of the transmitter specifications for the HDSL2 PAM embodiment described with reference to FIGS. 3–6:

| Downstream (DS) Transmitter: normally located in CO | |
|---|---|
| Transmit Power: | 9.7 dBm |
| Max PSD: | −44.0 dBm/Hz |
| PSD: | See FIG. 5 |
| Baud Rate: | 1.03467 MHZ |
| Constellation Size: | 2 bits/dimension |
| Information Rate: | 1.5 bits/dimension |
| Upstream (US) Transmitter: normally located in RT | |
| Transmit Power: | 14.7 dBm |
| Max PSD: | −38.0 dBm/Hz |
| PSD: | See FIG. 6 |
| Baud Rate: | 620.8 kHz |
| Constellation Size: | 3 bits/dimension |
| Information Rate: | 2.5 bits/dimension |

The following is a summary of system performance and spectral compatibility of the PAM embodiment described with reference to FIG. 4 in the presence of the following interferers: ANSI TR-28 HDSL, T1, ANSI T1.601 DSL, ANSI T1.413 DMT ADSL (both echo-cancelled ("EC") and FDM options), and CAP/QAM RADSL (T1E1.4/96-170R1). The analysis involved frequency domain simulations (as described in T1E1.4/95-107) to compute signal to noise ratios ("SNR") which were mapped analytically to probability of symbol error. When assessing the performance of the PAM embodiment in the presence of other service interferers, uncoded margin values for $10^{-7}$ error rates are calculated assuming that this error rate can be achieved with an SNR of 18.5 dB for the downstream ("DS") receiver and 24.5 dB for the upstream ("US") receiver. Simulations of trellis coded modulation techniques suitable for sequential decoding show that the $10^{-7}$ error rate can be achieved at an SNR of 13.4 dB for the downstream receiver and 19.6 dB for the upstream receiver. See T1E1.4/97-072. Both the uncoded and coded margins on the two most difficult loops, CSA 6 (9 kft of 26 AWG) and CSA 4, are shown in Tables 1 and 2 for the upstream and downstream links respectively. Tables 1 and 2 show that 5 dB of coded theoretical margin is achieved on CSA 6, and 6 dB coded margin is achieved for both loops for all interferers except EC ADSL.

TABLE 1

US link (receiver in central office) Theoretical Margins

| | CSA Loop 6 | | CSA Loop 4 | |
|---|---|---|---|---|
| Interferers | Uncoded | Coded | Uncoded | Coded |
| 39 Self NEXT/FEXT | 4.8dB | 9.7dB | 3.6dB | 8.5dB |
| 25 EC-ADSL NEXT/FEXT | 1.2 | 6.1 | 0.1 | 5.0 |
| 49 HDSL NEXT | 3.7 | 8.6 | 2.5 | 7.4 |
| 49 T1 NEXT | 14.7 | 19.6 | 13.5 | 18.4 |
| 49 FDM-ADSLD NEXT, 49 ADSLU FEXT | 5.4 | 10.3 | 4.1 | 9.0 |

TABLE 1-continued

US link (receiver in central office) Theoretical Margins

| | CSA Loop 6 | | CSA Loop 4 | |
|---|---|---|---|---|
| Interferers | Uncoded | Coded | Uncoded | Coded |
| 49 CAP/QAM RADSL NEXT/FEXT | 18.7 | 23.6 | 17.5 | 22.4 |
| 49 DSL (IDSN-BRI) NEXT | 19.5 | 24.4 | 18.3 | 23.2 |
| 20 HDSL NEXT + 20 Self NEXT/FEXT | 3.4 | 8.3 | 2.2 | 7.1 |
| 20 T1 NEXT + 20 Self N/F | 6.7 | 11.6 | 5.5 | 10.4 |
| 20 EC-ADSL NEXT + 20 Self N/F | 1.3 | 5.2 | 0.1 | 5.0 |
| 20 FDM ADSL NXT/FXT + 20 Self N/F | 2.9 | 7.8 | 1.8 | 6.7 |
| 20 RADSL N/F + 20 Self N/F | 6.9 | 11.8 | 5.7 | 10.6 |

TABLE 2

DS link (receiver at the remote site) Theoretical Margins

| | CSA Loop 6 | | CSA Loop 4 | |
|---|---|---|---|---|
| Interferers | Uncoded | Coded | Uncoded | Coded |
| 39 Self NEXT/FEXT | 5.0dB | 10.1dB | 3.7dB | 8.8dB |
| 25 EC-ADSL FEXT/US-NEXT | 11.4 | 16.5 | 11.1 | 16.2 |
| 49 HDSL NEXT | 7.2 | 12.3 | 5.4 | 10.5 |
| 25 T1 NEXT | 3.6 | 8.7 | 2.5 | 7.6 |
| 49 FDM-ADSLD NEXT, 49 ADSLU NEXT | 10.8 | 15.9 | 10.5 | 15.6 |
| 49 CAP/QAM RADSL NEXT/FEXT | 11.1 | 16.2 | 10.4 | 15.5 |
| 49 DSL (ISDN-BRI) NEXT | 18.4 | 23.5 | 16.5 | 21.6 |

The simulation procedure used to calculate performance data is described in T1E1.4/95-107. The NEXT coupling model is described in T1E1.4/96-036. The FEXT coupling model is extrapolated from that in T1.413 using the $N^{0.6}$ scaling adopted for NEXT. NEXT and FEXT spectra are added together with −140 dBm/Hz white noise to obtain the composite crosstalk spectrum. The loop models use interpolation of the primary constants to obtain loss values at frequencies not tabulated in T1.601. Trapezoidal integration was used with 500 points in the Nyquist band.

The interferer power spectral densities ("PSD") for EC and FDM ADSL are based on that from B.4 and B.5 in T1.413 with the sin(x)/(x) term removed to let the PSD match the transmit PSD mask in the same specification. In addition, for the FDM case, the corner frequency of the HPF is increased from 20 to 120 kHz. The interferer PSDs for CAP/QAM RADSL are those described in Tables 5 & 6 of T1E1.4/96-170R1; see also T1E1.4/96-107.

The T1.413 ADSL standard allows great flexibility in the implementation of carrier allocation. In Table 2, two extremes are represented (1) using all available carriers for the downstream direction, which is only implementable with the echo-canceled option, and (2) using only carriers 40 and above for the downstream direction. The ADSL PSD model for option 1 is that of a flat −40 dBm/Hz filtered with a 4th order Butterworth HPF with a corner frequency of 20 KHz. The PSD for option 2 is the same, but with the corner frequency moved to 120 kHz. Since the lower edge of the downstream ADSL PSD, even for the echo-canceled systems, is not required to be at 20 kHz, the performance of apparatus constructed and arranged in accordance with the present invention with different numbers of ADSL interferers ("disturbers") is examined as the HPF corner frequency was moved between 20 and 120 kHz. The results are shown in Table A in order of increasing number of disturbers and corner frequencies. From Table A, it can be seen that 5 dB of coded margin can be achieved with either (a) 25 disturber, 20 kHz; (b) 39 disturber, 40 kHz; or (c) 49 disturber, 45 kHz corner frequency. In addition, about 7 dB of coded margin can be achieved with either (d) 25 disturber, 50 kHz corner; (e) 39 disturber, 70 kHz corner; or (f) 49 disturber, 80 kHz corner frequency.

TABLE A

US link margins vs. ADSL Downstream HPF corner

| N Disturber DMT ADSL NEXT/FEXT Downstream | CSA Loop 6 | | CSA Loop 4 | |
|---|---|---|---|---|
| HPF corner frequency | Uncoded | Coded | Uncoded | Coded |
| N = 25, 20 kHz | 1.2dB | 6.1dB | 0.1dB | 5.0dB |
| N = 39, 40 kHz | 1.5 | 6.4 | 0.4 | 5.3 |
| N = 49, 45 kHz | 1.3 | 6.2 | 0.2 | 5.1 |
| N = 25, 50 kHz | 3.2 | 8.1 | 2.0 | 6.9 |
| N = 39, 70 kHz | 3.3 | 8.2 | 2.1 | 7.0 |
| N = 49, 80 kHz | 3.3 | 8.2 | 2.1 | 7.0 |
| N = 49, 120 kHz | 5.4 | 10.3 | 4.1 | 9.0 |

The PAM embodiment has been designed to have minimal interference into other services. Tables 4 through 7 show the impacts on the other services resulting from deployment of the PAM embodiment.

Table 3 shows the theoretical margin for HDSL in the presence of self-NEXT and PAM embodiment's NEXT/FEXT for CSA loops 4 and 6. From Table 3, it can be seen that the interference caused by the PAM embodiment is about the same as that caused by self-NEXT of the HDSL disturber. The margins are computed using the simulation method described above.

TABLE 3

HDSL Theoretical Margin

| Interferers/loop | CSA 4 | CSA 6 |
|---|---|---|
| 49-Self NEXT | 7.5 dB | 8.0 dB |
| 39 FIG. 4 Embodiment US-N/DS-F | 7.5 dB | 7.9 dB |

Table 4 shows the theoretical margins for EC-DMT ADSL downstream in the presence of self NEXT/FEXT, of NEXT/FEXT from the PAM embodiment, and of HDSL NEXT. The analysis (described in T1E1.4/95-137) assumes a transmit PSD according to T1.413, no power boost (−40 dBm/Hz nominal), 4 dB coding gain, trellis coding (half-bit constellations), and that carriers 7 and up are used for the downstream transmission.

TABLE 4

EC (Category 2) DMT-ADSL Downstream Theoretical Margin

| Interferers/loop | CSA 4 | CSA 6 |
|---|---|---|
| 39 HDSL NEXT | 10.0 dB | 8.8 dB |
| 39 FIG. 4 Embodiment US-N/DS-F | 9.4 dB | 8.3 dB |
| 39 Self NEXT/FEXT | 8.4 dB | 7.9 dB |

Table 5 shows the theoretical margins for FDM-DMT ADSL downstream in the presence of self NEXT/FEXT, of NEXT/FEXT from the PAM embodiment, and of HDSL NEXT. The analysis (similar to that of T1E1.4/95-137, but with integral-bit uncoded constellation) assumes a transmit PSD according to T1.413, no power boost (−40 dBm/Hz nominal), 2 dB RS coding gain, no trellis coding, and that carriers 40 and up are used for the downstream transmission.

TABLE 5

FDM (Category 1) DMT-ADSL Downstream Theoretical Margin

| Interferers/loop | CSA 4 | CSA 6 |
|---|---|---|
| 39 HDSL NEXT | 6.1 dB | 4.8 dB |
| 39 FIG. 4 Embodiment US-N/DS-F | 5.3 dB | 4.3 dB |
| 39 Self NEXT/FEXT | 4.3 dB | 3.7 dB |

The PAM embodiment is not a limiting impairment for T1.413 ADSL Upstream. This is because the downstream transmitter of the PAM embodiment has a lower PSD than HDSL at all frequencies below 200 KHz, so less crosstalk is received from the PAM embodiment than from HDSL crosstalk.

Table 6 shows the calculated theoretical margin for CAP/QAM 256 UC RADSL (1.088 k baud, Req. SNR=33.8 dB) with no power boost on 8100 ft of 26 AWG. (the 6 dB margin range published in T1E1.4/96-170R1—Table 26) for a variety of interferers. The margins are computed using the simulation method described above with a transmit PSD according to Table 6 of T1E1.4/96-170R1.

TABLE 6

CAP/QAM RADSL Downstream Theoretical Margin

| Interferers/loop | 8100 ft, 26 AWG |
|---|---|
| 24 HDSL NEXT | 6.4dB |
| 39 FIG. 4 Embodiment US-N/DS-F | 6.2 |
| 39 FIG. 4 Embodiment US-N/DS-F | 6.1 |
| 39 Self NEXT/FEXT | 0.3 |

The PAM embodiment is not a limiting impairment for CAP/QAM RADSL Upstream. This is because the downstream transmitter of the PAM embodiment has a lower PSD than HDSL at all frequencies below 200 KHz, less crosstalk is received from the PAM embodiment than from HDSL service.

Because the PSD of the PAM embodiment is less than that of DSL at all frequencies within the DSL bandwidth, crosstalk from the PAM embodiment is less of an impairment for DSL than self-crosstalk.

Table 7 shows calculated powers for the crosstalk noise into T1 systems for both self-crosstalk and crosstalk from the PAM embodiment and HDSL systems. Adjacent binder group NEXT has the crosstalk coupling function attenuated 10 dB at all frequencies. The line length used for FEXT is 3000 ft of 24 AWG. The shaped noise power assumes use of the measured T1 receive filter for a 15 dB (3 kft 24 AWG) loop as described in T1E1.4/97-071).

TABLE 7

T1 Received Noise Power

| Interferers/loop | Noise Power | Shaped Noise Power |
|---|---|---|
| 49 T1 NEXT (adj. binder) | −39.9dBm | −38.3dBm |
| 49 FIG. 4 Embodiment US-NEXT | −39.9dBm | −45.5dBm |

TABLE 7-continued

T1 Received Noise Power

| Interferersfloop | Noise Power | Shaped Noise Power |
|---|---|---|
| 49 FIG. 4 Embodiment DS-NEXT | −43.4dBm | −47.7dBm |
| 49 HDSL NEXT | −43.1dBm | −49.8dBm |
| 49 FIG. 4 Embodiment US-N/DS-F | −39.5dBm | −45.1dBm |
| 49 FIG. 4 Embodiment DS-N/US-F | −41.8dBm | −46.5dBm |
| 49 T1 FEXT/adj. NEXT | −37.5dBm | −36.1 dB |

The NEXT and FEXT interference generated by 49 PAM embodiment services acting as interferers have less NEXT/FEXT power than the same number of T1 services acting as interferers. With the shaping of the measured T1 receive filter, the difference is even more pronounced. Therefore, the PAM embodiment does not interfere with T1 service more than T1 service interferes with itself.

Thus, I have described novel methods and apparatus for communicating information on bidirectional media subject to interference.

Although the present invention has been described in connection with particular embodiments thereof, it is to be understood that additional embodiments, modifications, and applications thereof, which will be obvious to those skilled in the art are included within the spirit and scope of the present invention. While I have disclosed particular embodiments of the present invention, variations in procedural and structural detail within the scope of the appended claims and which are within the skill of those of ordinary skill in the communications art to provide, are possible, and I contemplate them. I have no intention to limit the scope of the appended claims to the abstract or to the exact disclosure herein presented.

I claim:

1. A method for simultaneously transmitting data at a symmetrical rate in two directions on a bidirectional medium subject to interference, the method comprising the steps of:

(1) transmitting a first signal in one direction on said medium, said data modulating a first plurality of carriers thereby generating said first signal;

(2) transmitting a second signal in the other direction on said medium said data modulating a second plurality of carriers thereby generating said second signal; and (3) spectrally shaping at least one passband of said generated signals prior to transmission such that the plurality of passbands of said signals are partially overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

2. A method for simultaneously transmitting data at a symmetrical data transmission rate in two directions on a bidirectional medium subject to interference, the method comprising the steps of:

(1) transmitting a first signal in one direction on said medium, said data modulating a carrier thereby generating said first signal;

(2) transmitting a second signal in the other direction on said medium said data modulating a carrier thereby generating said second signal; and, (3) spectrally shaping said signals prior to transmission such that the passbands of said signals are partially overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

3. A method for simultaneously transmitting data at a symmetrical data transmission rate in two directions on a bidirectional medium subject to interference, the method comprising the steps of:

(1) transmitting a first signal in one direction on said medium wherein said first signal is generated by modulating a first carrier at a first baud rate (2) transmitting a second signal in the other direction on said medium wherein said second signal is generated by modulating a second carrier at a second baud rate; and (3) spectrally shaping said signals prior to transmission such that the passbands of said signals are partially overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

4. The method according to claim 1, 2, or 3 further comprising the step of echo canceling said signals.

5. The method according to claim 3, wherein said first baud rate differs in magnitude from said second baud rate.

6. Apparatus for simultaneously transmitting data at a symmetrical transmission rate in two directions on a bidirectional medium subject to interference, said apparatus comprising:

(1) a first transceiver, including an echo canceler, transmitting a first signal comprising a carrier, modulated by said data, in one direction on said medium; and (2) a second transceiver, including an echo canceler, transmitting a second signal comprising a carrier, modulated by said data, in the other direction on said medium;

said transceivers being so constructed and arranged that said signals are spectrally shaped and echo canceled, such that said signals are transmitted in partially overlapped passbands, the passbands being overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

7. Apparatus for simultaneously communicating data in two directions at a symmetric rate on a bidirectional medium subject to interference, said apparatus comprising:

(1) a first transceiver, including an echo canceler, transmitting a first signal in one direction on said medium wherein the first signal is generated by a first data stream at said symmetric rate modulating a first plurality of carriers; and (2) a second transceiver, including an echo canceler, transmitting a second signal in the other direction on said medium wherein the second signal is generated by a second data stream at said symmetric rate modulating a second plurality of carriers;

said transceivers being so constructed and arranged that said signals are spectrally shaped prior to transmission such that the plurality of passbands of said signals are partially overlapped in such manner that performance margins due to interference caused by signals of the same kind being transmitted on said medium are greater than performance margins in a first design specification and further such that interference caused by said first and second signals and said signals of the same kind does not reduce performance margins in different services being transmitted on said medium below performance margins in a second design specification.

8. The apparatus according to claim 6, wherein each of said transceivers further comprises a channel coder, a pre-equalizer, a line coder, a receiver front end, an adaptive feed forward equalizer, and a decision device.

9. A method for simultaneously communicating data in two directions at a symmetric rate over a twisted copper pair in a cable of twisted copper pairs subject to ingress and egress crosstalk coupling into and from other twisted copper pairs in said cable, the method comprising the steps of:

transmitting a first signal in one direction on said twisted copper pair wherein the first signal is generated by a first data stream at said symmetric rate modulating a first plurality of carriers;

transmitting a second signal in the other direction on said twisted copper pair wherein the second signal is generated by a second data stream at said symmetric rate modulating a second plurality of carriers; and spectrally shaping said signals prior to transmission such that the passbands of said signals are partially overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

10. A method for simultaneously communicating data in two directions at a symmetric rate over a twisted copper pair in a cable subject to ingress and egress crosstalk coupling into and from other twisted copper pairs in the cable, the method comprising the steps of:

transmitting a first signal in one direction on said twisted copper pair wherein the first signal is generated by a first data stream at said symmetric rate modulating a first carrier;

transmitting a second signal in the other direction on said twisted copper pair wherein the second signal is generated by a second data stream at said symmetric rate modulating a second carrier; and spectrally shaping said signals prior to transmission such that the passbands of said signals are partially overlapped in such manner that performance margins due to interference caused by signals of the same kind being transmitted on said medium are greater than performance margins in a first design specification and further that interference caused by said first and second signals and said signals of the same kind does not reduce performance margins in different services being transmitted on said medium below performance margins in a second design specification.

11. Apparatus using pulse amplitude modulation and echo canceling for simultaneously transmitting data at a symmetrical transmission rate in two directions on a bidirectional medium subject to interference, said apparatus comprising:

(1) a first transceiver, including an echo canceler, transmitting data on said medium in one direction; and (2) a second transceiver, including an echo canceler, transmitting data on said medium in the other direction;

said transceivers being so constructed and arranged that transmissions on said medium are spectrally shaped and echo canceled, such that said signals are transmitted in partially overlapped passbands, the passbands being overlapped in such manner that performance margins due to interference caused by signals of the same kind being transmitted on said medium are greater than performance margins in a first design specification and further that interference caused by said first and second signals of the same kind does not reduce performance margins in different services being transmitted on said medium below performance margins in a second design specification.

12. The method according to claim 1, 2, 5, 9, or 10 wherein said spectral shaping comprises transmitting said signals with unequal transmit power in said directions.

13. Apparatus for simultaneously communicating data in two directions at a symmetric rate over a twisted copper pair in a cable subject to ingress and egress crosstalk coupling between other twisted copper pairs in said cable, said apparatus comprising:

(1) a first transceiver, including an echo canceler, transmitting a first signal in one direction on said twisted copper pair wherein the first signal is generated by a first data stream at said symmetric rate modulating a first carrier; and (2) a second transceiver, including an echo canceler, transmitting a second signal in the other direction on said twisted copper pair wherein the second signal is generated by a second data stream at said symmetric rate modulating a second carrier;

said transceivers being so constructed and arranged that said signals are echo canceled and spectrally shaped, such that said signals are transmitted in partially overlapped passbands, the passbands being overlapped in such manner that performance margins due to interference caused by signals of the same kind being transmitted on said cable are greater than performance margins in a first design specification and further that interference caused by said first and second signals and said signals of the same kind does not reduce performance margins in different services being transmitted on said cable below performance margins in a second design specification.

14. Apparatus for simultaneously communicating data in two directions at a symmetric rate over a twisted copper pair in a cable of twisted copper pairs subject to ingress and egress crosstalk coupling into and from other twisted copper pairs in said cable, said apparatus comprising:

(1) a first transceiver, including an echo canceler, transmitting a first signal in one direction on said twisted copper pair wherein the first signal is generated by a first data stream at said symmetric rate modulating a first plurality of carriers; and (2) a second transceiver, including an echo canceler, transmitting a second signal in the other direction on said twisted copper pair wherein the second signal is generated by a second data stream at said symmetric rate modulating a second plurality of carriers;

said transceivers being so constructed and arranged that said signals are spectrally shaped prior to transmission such that the plurality of passbands of said signals are partially overlapped in such manner that performance margins due to self-crosstalk are greater than performance margins in a first design specification and further such that egress crosstalk from said twisted copper pair does not reduce performance margins in different services deployed in said other twisted copper pairs below performance margins in a second design specification.

15. The apparatus according to claim 6, 11, 13, 14 or 7 wherein a second transmit power spectral density characterizing said second transceiver is swapped with a first transmit power spectral density characterizing said first transceiver.

16. The method of claim 1, 2, 3, 9 or 10, further comprising the step of swapping a second transmit power spectral density characterizing transmission of said data in said second direction on said medium with a first transmit power spectral density characterizing transmission of said data in said first direction on said medium.

17. The method of claim 3, wherein said first baud rate is equal to said second baud rate.

18. The apparatus according to claim 6, 11, 13, 14, or 7 wherein said spectrally shaped signals include at least one spectrally shaped stopband, one spectrally shaped passband, and one spectrally shaped transition band.

19. The apparatus according to claim 6, 11, 13, 14, or 7 wherein said spectrally shaped signals are transmitted in said directions with unequal transmit power.

20. The method of claim 1, 2, 3, 9, or 10 wherein said performance margins in said first design specification are determined based on the level of interference caused by said different services being transmitted on said medium.

21. The apparatus of claim 6, 11, 13, 14, or 7 wherein said performance margins in said first design specification are determined based on the level of interference caused by said different services being transmitted on said medium.

22. The method of claim 16 wherein said swapping step is performed automatically upon the sensing of an interference level that exceeds a predetermined preselected level.

23. The apparatus according to claim 7, wherein said signals are discrete multi-tone modulated signals.

* * * * *

UNITED STATES PATENT AND TRADEMARK OFFICE
CERTIFICATE OF CORRECTION

PATENT NO. : 6,246,716 B1
DATED : June 12, 2001
INVENTOR(S) : Kevin Wayne Schneider It is certified that error appears in the above-identified patent and that said Letters Patent is hereby corrected as shown below:

Title page, item [54] and Column 1, line 1,
Title, "INFORMATION COMMUNICATION SYSTEM" should read
-- METHOD AND APPARATUS FOR REDUCING CROSSTALK IN A BIDIRECTIONAL COMMUNICATION SYSTEM BY USING SPECTRALLY SHAPED BANDWIDTHS HAVING PARTIAL OVERLAP --

Title page,
Item [57], ABSTRACT,
Line 2, "municatinginformation" should read -- municating information --
Line 3, "tointerference" should read -- to interference --

Drawings,
Sheet 3, FIG. 6, the question mark ("?") appearing on the abscissa coordinate axis should read -- 0.065 --

Column 4,
Line 41, "of." should read -- of: --

Column 6,
Line 22, "preceding" should read -- precoding --

Column 10,
Table 1, "(IDSN-BRI)" should read -- (ISDN-BRI) --

Column 11,
Tables 3 and 4, "Interferersfloop" should read -- Interferers \ Loop --

Column 12,
Tables 5, 6 and 7, "Interferersfloop" should read -- Interferers \ Loop --
Lines 17 and 41, "Upstream." should read -- upstream. --

Column 13,
Line 47, "medium said" should read -- medium, said --
Table 7, "Interferersfloop" should read -- Interferers \ Loop --
Table 7-continued, "dB" should read -- dBm --

Column 14,
Line 2, "medium said" should read -- medium, said --

UNITED STATES PATENT AND TRADEMARK OFFICE
CERTIFICATE OF CORRECTION

PATENT NO.   : 6,246,716 B1
DATED        : June 12, 2001
INVENTOR(S)  : Kevin Wayne Schneider It is certified that error appears in the above-identified patent and that said Letters Patent is hereby corrected as shown below:

Column 16,
Line 30, "5," should read -- 3, --

Signed and Sealed this

Second Day of September, 2003

JAMES E. ROGAN
*Director of the United States Patent and Trademark Office*